(12) United States Patent
Muller (10) Patent No.: US 10,081,519 B2
(45) Date of Patent: Sep. 25, 2018

(54) TOOL FOR HANDLING A LONG AND HEAVY OBJECT

(71) Applicant: AREVA WIND GMBH, Bremerhaven (DE)

(72) Inventor: Mathias Muller, Lilienthal (DE)

(73) Assignee: AREVA WIND GMBH (DE)

( * ) Notice: Subject to any disclaimer, the term of this patent is extended or adjusted under 35 U.S.C. 154(b) by 54 days.

(21) Appl. No.: 15/127,037

(22) PCT Filed: Mar. 26, 2015

(86) PCT No.: PCT/EP2015/056606
§ 371 (c)(1),
(2) Date: Sep. 19, 2016

(87) PCT Pub. No.: WO2015/144837
PCT Pub. Date: Oct. 1, 2015

(65) Prior Publication Data
US 2017/0107085 A1    Apr. 20, 2017

(30) Foreign Application Priority Data

Mar. 26, 2014 (EP) .................................... 14161674

(51) Int. Cl.
*B66C 1/00*     (2006.01)
*B66C 1/10*     (2006.01)
(Continued)

(52) U.S. Cl.
CPC .............. *B66C 13/08* (2013.01); *B66C 1/108* (2013.01); *B66C 1/42* (2013.01); *F03D 1/001* (2013.01);
(Continued)

(58) Field of Classification Search
CPC ............ B66C 1/42; B66C 1/108; B66C 13/08
(Continued)

(56) References Cited

U.S. PATENT DOCUMENTS 2,844,404 A * 7/1958 Haugh ...................... B66C 1/10
248/324
8,191,721 B2   6/2012 Hansen et al.
(Continued)

FOREIGN PATENT DOCUMENTS

EP     2589795     5/2013
GB     2327930     2/1999
(Continued)

OTHER PUBLICATIONS

English translation of Japanese counterpart office action, dated Aug. 15, 2017.
(Continued)

*Primary Examiner* — Paul T Chin
(74) *Attorney, Agent, or Firm* — Carlson, Gaskey & Olds, P.C.

(57) ABSTRACT

A tool for handling a long and heavy object, in particular a wind turbine rotor blade, includes a clamping unit which can be fixed to the rotor blade. The clamping unit has a first clamp and a second clamp spaced from the first clamp with respect to a longitudinal direction of the object. A first rod unit is rotatably coupled to the first clamp of the clamping unit at a first coupling site is also and coupled to a traverse. A second rod unit is rotatably coupled to the second clamp of the clamping unit at a second coupling site and is also coupled to the traverse via by a rope. A length of a rope section between the second rod unit and the traverse is adjustable by a winch.

18 Claims, 4 Drawing Sheets

(51) Int. Cl.
  *B66C 1/42* (2006.01)
  *B66C 13/08* (2006.01)
  *F03D 1/00* (2006.01)
  *F03D 1/06* (2006.01)

(52) U.S. Cl.
  CPC ........ *F03D 1/0675* (2013.01); *F05B 2230/61* (2013.01)

(58) Field of Classification Search
  USPC .................................. 294/67.5, 67.21, 67.22
  See application file for complete search history.

(56) References Cited

U.S. PATENT DOCUMENTS

| | | | | |
|---|---|---|---|---|
| 2006/0266528 | A1* | 11/2006 | Kulhanek | B66C 13/08 166/380 |
| 2007/0284327 | A1* | 12/2007 | Gonzalez | B66C 13/08 212/242 |
| 2011/0221215 | A1* | 9/2011 | Botwright | B66C 1/108 294/81.4 |
| 2015/0151953 | A1* | 6/2015 | Weterings | B66C 13/08 212/273 |

FOREIGN PATENT DOCUMENTS

| | | |
|---|---|---|
| JP | S5520316 | 2/1980 |
| JP | 62-105991 | 7/1987 |
| JP | H08218641 | 8/1996 |
| KR | 101338407 | 12/2013 |
| WO | 2003100249 | 4/2003 |
| WO | 2012095112 | 7/2012 |

OTHER PUBLICATIONS

International Preliminary Report on Patentability, dated Sep. 27, 2016.
English translation of Korean counterpart office action, dated Jul. 17, 2017.
International Preliminary Report on Patentability from corresponding PCT/EP2015/055895, dated Sep. 20, 2016.
International Search Report, dated Apr. 13, 2015.

* cited by examiner

TOOL FOR HANDLING A LONG AND HEAVY OBJECT

CROSS-REFERENCE TO RELATED APPLICATIONS

This application is the U.S. national phase of PCT/EP2015/056606, filed Mar. 26, 2015, claiming priority to EP 14 161 674.8, filed Mar. 26, 2014.

FIELD OF THE INVENTION

The invention relates to a tool for handling a long and heavy object, in particular a wind turbine rotor blade.

BACKGROUND

In recent years it has become more and more common to install the rotor blades of a wind turbine individually, i. e. one at a time, to the hub which is already mounted on the wind turbine tower. This so-called single blade installation procedure provides many benefits, especially when wind turbines are installed in offshore parks, mountainous or forest areas, or other sites where space is limited. Moreover, maintenance is more economic when a single blade can be replaced right on the spot instead of having to take down the entire rotor arrangement first, which requires at least one rather large crane.

Figure 1:
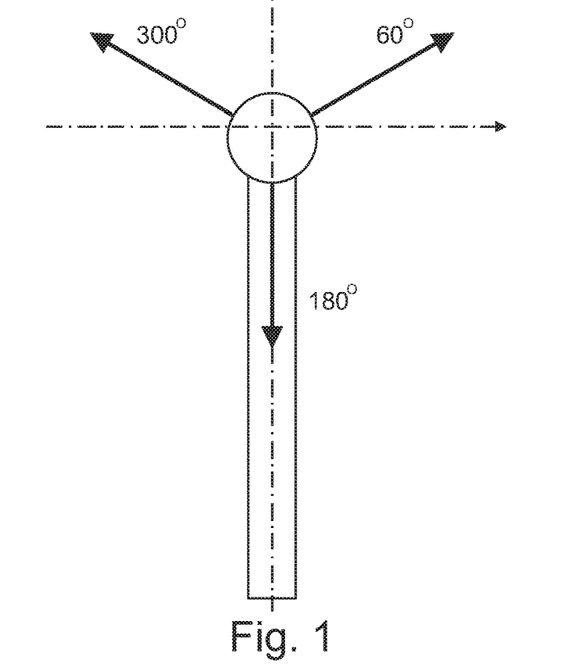
FIG. 1 shows typical single blade installation positions of a wind turbine having three rotor blades.

However, it has to be considered that usually the drivetrain of a wind turbine can only be rotated when either none or all rotor blades are installed. This means that after installation of the first blade, the installation positions for the further rotor blades are fixed. Hereinbelow, any blade installation position is to be referred to the axis of rotation of the hub as illustrated in FIG. 1, the 0° position being the position in which the tip of the respective blade has the highest position possible. For example, if the first blade of a three blade rotor is installed in the 180° position, the other two blades have to be installed in the 60° position and in the 300° position, respectively.

Another important aspect of the single blade installation is the number of cranes used for lifting and tilting the blades towards their installation positions. While it is easier to handle a blade with two separate cranes at the same time, this method is difficult to implement offshore or at sites where space is limited and is therefore not economic in such areas. For that reason the single blade installation method would be preferred if there were suitable tools available to handle a blade with a single crane.

Several arrangements for handling long and heavy objects like wind turbine rotor blades are known in the prior art. For example, EP 2 623 768 A1 shows a lifting frame for lifting and tilting a wind turbine rotor blade with a single crane. In one embodiment a main frame, which is fixed to the rotor blade, can be tilted relative to a sub-frame using a rope or the like. By driving a tensioning winch, a rope section running from a pulley at the frame end facing the blade tip to a crane hook can be shortened, while at the same time a rope section running from a pulley at the frame end facing the blade root to the crane hook is lengthened. By this measure the main frame is aligned to the sub-frame, thus allowing the mounting of the rotor blade to the rotor hub of the wind turbine in a 60° or 300° position. This construction requires a main frame and a sub frame pivotably connected thereto. Due to the triangular rope path the tilting movement is limited. In particular, no vertical orientation of the rotor blade allowing a 180° installation can be reached.

In WO 2012/0062352 A1 a lifting beam for use in hoisting a wind turbine blade is shown. The lifting beam, which is suspended from a crane using two cables, includes a root manipulation system with a cable connected to a winch at one end and coupled to a sling carrying the root of the blade at the other end. By actuation of the winch, the height of the sling carrying the blade root can be adjusted, thereby changing the orientation of the blade. A similar tip manipulation system for raising or lowering the tip of the blade is also provided. However, despite the separate root and tip manipulation systems located at the very ends of the beam, this construction allows adjusting the orientation of the blade only within a small angular range. Rotating the blade to a 180° installation position is not possible.

U.S. Pat. No. 8 191 721 B2 relates to a wind turbine blade lifting system with a crane boom and a lifting device (frame) which can be connected to the wind turbine blade. The system further includes two individually controllable winches connected to two control wires and a bearing wire connected to a separate winch which is operated for lifting the lifting device with the turbine blade fixed thereto. The bearing wire is fixed to a central area of the lifting device while the control wires are fixed to the frame at distant ends thereof. The control wires run via pulleys mounted onto a sliding carriage which can be moved along the crane boom. The turbine blade is lifted into a substantially horizontal position while the sliding carriage with the pulleys follows the blade on its way upwards. By differently pre-tensioning the control wires, the horizontal orientation of the turbine blade is varied. Yet, rotating the turbine blade into a vertical position is not possible.

WO 03/100249 A1 shows a system for handling a wind turbine blade with a yoke-shaped gripping unit. The blade to be installed is positioned in the gripping unit close to its root end. The gripping unit, which includes a lever arm with a weight at its free end, is suspended with three crane wires. The first wire is connected to the free end of the lever arm at the back of the gripping unit, and to the crane on a crane bar above the blade. The second wire is connected to the front of the gripping unit facing the root of the blade, and at a different position on the same crane bar. The third wire is also connected to the free end of the lever arm, and to the main body of the crane. With the crane motor and the first and second wires it is possible to rotate the blade from a horizontal position into a vertical position. During lifting of the blade the third wire and the lever arm with the weight facilitate controlling the blade. This construction is only configured for a 180° blade installation. The specific geometry of the crane bar and the free arm of the gripping unit ensure that neither the crane nor any wire interferes with the turbine hub.

From WO 2012/095112 A1 a tool for handling wind turbine blades is known, which comprises a frame and a connection arrangement for connecting the frame to a crane wire. The frame includes two sets of gripping organs operated with hydraulically driven actuators for engagement of the blade. With a hydraulic powered yaw between the connection arrangement and the frame the blade can be turned from a substantially horizontal orientation to practically any preferred position during lifting and mounting of the blade on the blade anchoring. However, the construction is rather complex and has several drawbacks regarding the practical use. First, the hydraulic system, including hydraulic actuators, an oil supply system and a number of hydraulic lines, takes up significant installation space in the tool and requires extensive maintenance. Several sub-units of the hydraulic systems need to be matched to each other and have to be available redundantly. Further, the bearing of the tool's rotating arm for tilting the blade about its center of gravity is quite complex. The hydraulic and electrical supply of the gripping organs, which has to be ensured permanently, requires a technically difficult configuration. Eventually, the supply equipment and part of the counterweight are accommodated in a container at the rear of the tool. Since the container faces the crane boom during lifting, the safety clearance between the tool holding the blade and the crane boom is reduced, thus limiting operability under severe wind conditions.

SUMMARY

It is an object of the invention to provide a tool of simple construction which allows controlled rotation of a lifted rotor blade.

According to the invention, a tool for handling a long and heavy object, in particular a wind turbine rotor blade, comprises a clamping unit which can be fixed to the object. The clamping unit has a first clamp and a second clamp spaced from the first clamp with respect to a longitudinal direction of the object. A first rod unit is rotatably coupled to the first clamp of the clamping unit at a first coupling site and is coupled to a traverse. A second rod unit is rotatably coupled to the second clamp of the clamping unit at a second coupling site and is coupled to the traverse via a rope. A length of a rope section between the second rod unit and the traverse is adjustable by a winch.

With the tool according to the invention, a rotor blade can be gripped by the clamping unit and lifted with a single crane. By actuation of the winch of the tool, the lifted rotor blade can be rotated, allowing the rotor blade to be mounted to a hub of a wind turbine in various positions. Compared to any hydraulic solutions, the winch is a rather small, simple and inexpensive device requiring only little maintenance effort.

In accordance with the invention, the term "rope" shall encompass cables, (textile) bands, chains or any other flexible members which are suitable to transmit tensile forces.

According to a preferred embodiment of the invention, the first and second clamps of the tool's clamp unit are interconnected, preferably by at least one strut. Thus, the clamps together with the strut(s) form a rigid frame structure.

In order to make the tool according to the invention especially suitable for an existing model of a wind turbine rotor blade, it may be provided that the strut has a predetermined length which is adapted to a distance between two given grabbing zones of such a specific model of a wind turbine rotor blade.

Especially with respect to the preferred application of the invention, the handling of a rotor blade to be mounted to an elevated wind turbine hub, it is expedient that the first and second clamps include profiled shells adapted to a contour of the object. In particular, the profiled shell of the first clamp may be adapted to the contour of a rotor blade at a site close to the blade root, while the profiled shell of the second clamp may be adapted to the contour of the rotor blade at a site closer to the blade tip.

In order to facilitate the rotation of the clamped object by altering the length of the rope section between the second rod unit and the traverse, an advantageous design of the tool according to the invention provides that a distance between the first coupling site and the traverse is smaller than a distance between the second coupling site and the traverse.

For an unobstructed rotation of the lifted object, rods of the first and second rod units are coupled to the first and second clamps, respectively, by pivot bearings which protrude outwardly in opposite directions, respectively. This prevents the corresponding rod ends from colliding with the object during rotation.

In view of a rotor blade installation in the 180° position, the following three aspects of the invention prove especially effective:

According to a first aspect, the first rod unit should include a pair of rods, with a lateral clearance between these rods being greater than a largest diameter of a portion of the object extending from the first coupling site in a direction away from the second coupling site. In other words: the distance between the rods of the first rod unit should be large enough so that the root of the rotor blade can pass therethrough during rotation of the rotor blade.

According to a second aspect, the length of the rods of the first rod unit should be greater than the portion of the object extending from the first coupling site in a direction away from the second coupling site. This makes it possible to completely turn the rotor blade into the 180° position as the blade root can be positioned below the traverse without contacting the traverse.

According to a third aspect, the lateral clearance between the rods of the first rod unit should further increase as viewed from the first coupling site towards the traverse. In particular, the distance between the rods should become greater than the diameter of the hub of the wind turbine so that the traverse can be positioned above the hub with the rods letting the hub pass between the traverse and the blade root untouched. The rotor blade can then easily be attached to the hub as the blade root directly faces the lower side of the hub.

Regarding the coupling of the rope to the second rod unit, according to one embodiment, the second rod unit includes a pair of rods converging at a connection point where one end of the rope is attached.

The winch of the tool according to the invention may be mounted on the traverse. From a functional point of view, this is the most effective place for the winch because no pulleys or other means for deflecting the rope are necessary to adjust the distance between the second rod unit and the traverse.

In a preferred embodiment of the invention the traverse is adapted to be coupled to a crane hook, e. g. via a sling.

The winch may be mounted directly or indirectly on the traverse, on the clamping unit, or on one of the rod units of the tool. However, it is also possible that the winch is part of, or mounted on, a crane which is capable of lifting the clamp unit. According to the latter external arrangement of the winch, the winch may be a separate secondary winch of the crane. Alternatively, the winch of the tool may be a primary winch of the crane, with the rope of the tool being appropriately connected or coupled to the rope of the primary winch.

The present invention also provides a method of manufacturing a wind power plant using a tool in accordance with the aspects and embodiments described herein.

BRIEF DESCRIPTION OF THE DRAWINGS

Further features and advantages of the invention will become apparent from the following description and from the accompanying drawings to which reference is made. In the drawings.

DETAILED DESCRIPTION

As already mentioned, FIG. 1 shows three typical positions in which a rotor blade can be mounted to the hub of a wind turbine. The respective angles of the installation positions refer to the axis of rotation of the hub, starting with 0° at the 12 o'clock position.

Figure 2:
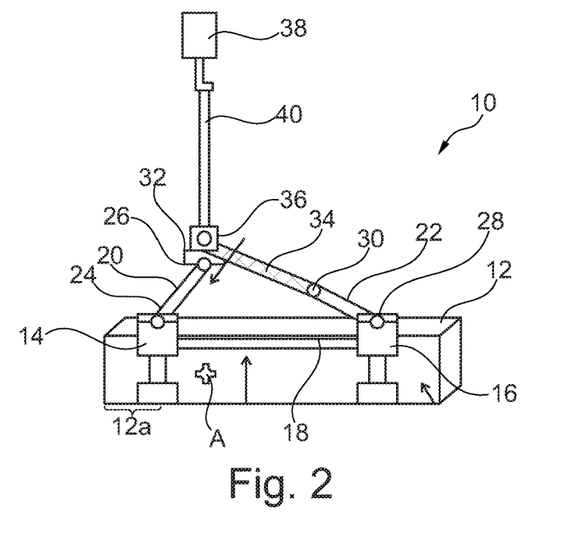
FIG. 2 shows a lateral view of a tool according to the invention with a long and heavy object in a horizontal position.

In FIG. 2, a tool 10 for handling a long and heavy object 12 is schematically shown. The tool 10 features a clamping unit with first and second clamps 14, 16 being spaced apart from each other. The two clamps 14, 16, which are interconnected by one or more strut(s) 18 to form a rigid frame structure, may be designed as profiled shells adapted to the contour of the object 12 to be handled. Although for the sake of simplicity an object 12 having a rectangular cross section is shown, the tool 10, in particular the clamps 14, 16 of the clamp unit, may be especially adapted to a wind turbine rotor blade having a round or curved cross-section, tapering towards one of its ends.

Figure 3:
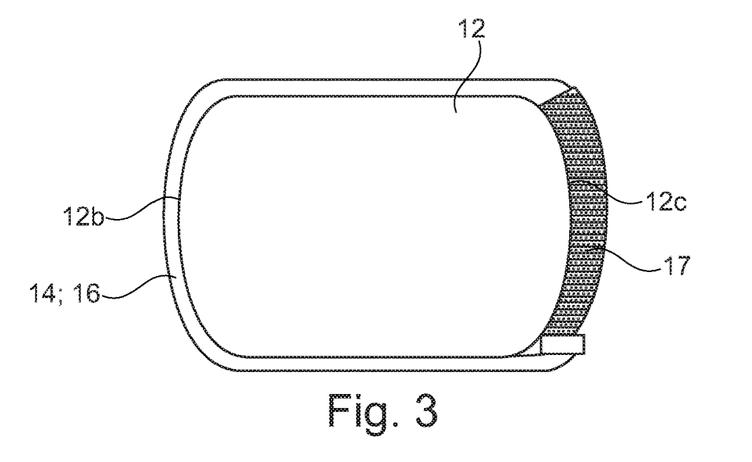
FIG. 3 shows a detailed cross-sectional view of a clamp of the tool holding the object.

The clamps 14, 16 can be fixed around the object 12 and locked, such that the object 12 is firmly held by the clamps 14, 16. For this purpose, one or both of the clamps 14, 16 may be provided with a belt 17 or the like in order to close the opening of the respective clamp, as shown in FIG. 3.

In case that the object 12 to be handled is a rotor blade, the rotor blade would be placed in the clamp unit such that the first clamp 14 is closer to the root of the rotor blade while the second clamp 16 is closer to the tip of the rotor blade.

First and second rod units 20, 22 are rotatably coupled to the first and second clamps 14, 16 of the clamping unit, respectively, thereby defining first and second coupling sites. In particular, the first rod unit 20 includes a pair of rods (only one rod can be seen in FIGS. 2 and 4 due to the perspective), one rod being coupled with a first end 24 to one side of the first clamp 14, the other rod being coupled with a first end 24 to the opposite side of the first clamp 14. The pivot bearings coupling the first rod ends 24 to the first clamp 14 protrude outwardly in opposite directions (FIG. 5a). Accordingly, a distance 15 between the first rod ends 24 is slightly greater than a local diameter 13 of the clamped object 12 as shown in FIG. 5a. Towards their opposite second ends 26, the distance 15 between the rods further increases to an extent greater than the diameter of the hub to which the rotor blade is to be mounted.

The second rod unit 22 basically has a similar structure, i. e. the second rod unit 22 includes a pair of rods (only one rod can be seen in FIGS. 2 and 4 due to the perspective), one rod being coupled with a first end 28 to one side of the second clamp 16, the other rod being coupled with a first end 28 to the opposite side of the second clamp 16. The pivot bearings coupling the first rod ends 28 to the second clamp 16 protrude outwardly in opposite directions. Accordingly, the distance between the first rod ends 28 is slightly greater than the local diameter of the clamped object 12.

Figure 5A:
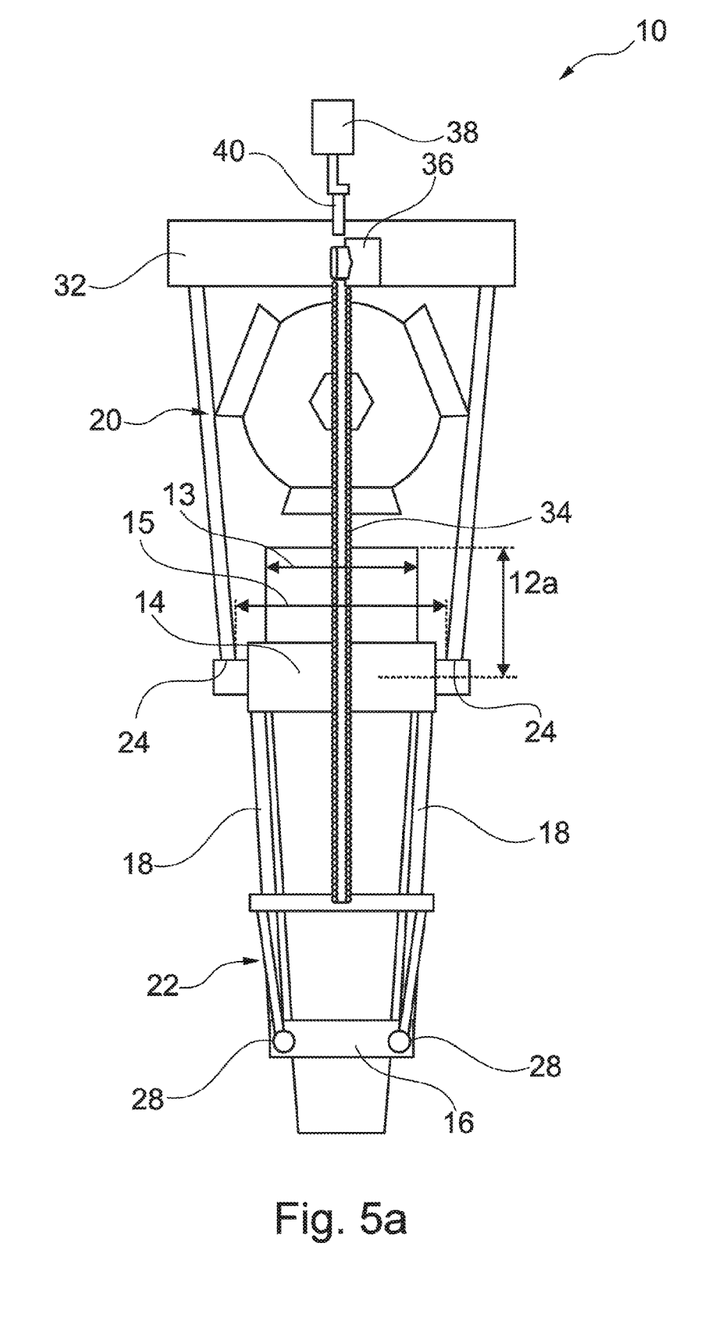
FIGS. 5a and 5b show front views of the tool and the object of FIG. 2 in a further inclined position.
Figure 5B:
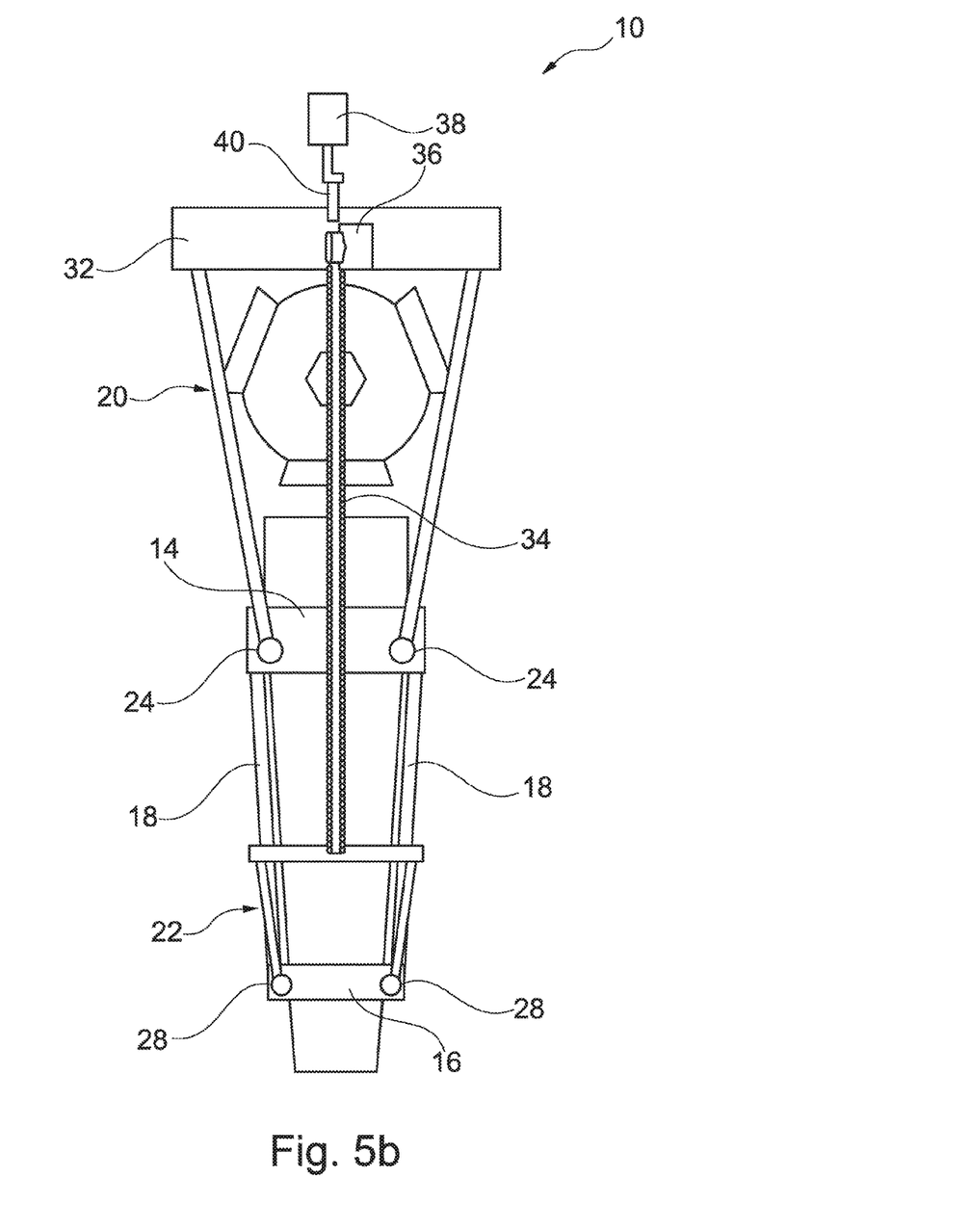

FIG. 5b shows a variant in which the bearings coupling the first rod ends 24 and 28 to the clamps 14 and 16, respectively, are not located at opposite lateral sides of the clamps 14, 16 but on one top side of the clamps 14, 16.

While the second ends 26 of the rods of the first rod unit 20 are rotatably coupled to a traverse 32, the second ends 30 of the rods of the second rod unit 22 are directly or indirectly connected to a rope 34. The rope 34 extends to a winch 36 which is mounted on the traverse 32. By actuating the winch 36, a length of a rope section between the second rod unit 22 and the traverse 32 can be varied.

Figure 4:
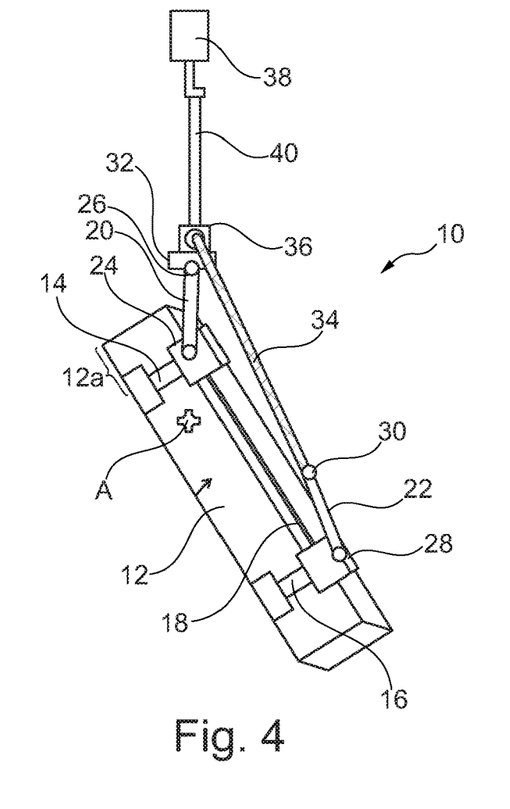
FIG. 4 shows a lateral view the tool and the object of FIG. 2 in an inclined position.

As can be seen in FIGS. 2 and 4, the distance between the first coupling site (the site where the first rod unit 20 is connected to the first clamp 14) and the traverse 32 is always smaller than the distance between the second coupling site (the site where the second rod unit 22 is connected to the second clamp 16) and the traverse 32, no matter how long or short the rope section between the second rod unit 22 and the traverse 32 is set. Further, the length of the rods of the first rod unit 20 is greater than that portion 12a of the object 12 which protrudes from the first coupling site in a direction away from the second coupling site.

In the following, the operation of the tool 10 is described using the example of a rotor blade which is to be mounted to a hub on a wind turbine tower in a 180° installation position.

First, the rotor blade is placed in the clamp unit such that the root of the rotor blade is very close to the first clamp 14 while the tip of the rotor blade is closer to the second clamp 16. In particular, the rotor blade is inserted into the clamps 14, 16, starting with the leading edge 12b of the rotor blade (cf. FIG. 3).

The clamps 14, 16, which are profiled to match the outer contour of the rotor blade, are tightened and locked so that the rotor blade is fixed in the clamp unit and cannot move therein, especially with respect to the longitudinal direction of the rotor blade. In addition or as an alternative, the open portion of the clamps 14, 16 at the trailing edge 12c of the rotor blade is closed by the belt 17 or the like.

The clamp unit may have been fixed to the rotor blade even before the transport of the rotor blade to the wind turbine, i. e. the clamp unit, or the whole tool 10, may also serve as a transport unit.

At the installation site, the traverse 32 is coupled to a hook 38 of a crane boom via a sling 40. The length of the rope section between the second rod unit 22 and the traverse 32 is adjusted such that when the hook 38 is lifted the rotatably coupled rod units 20, 22 take a position in which the clamp unit with the rotor blade remains in a horizontal orientation as shown in FIG. 2.

If the rotor blade was to be installed in a 90° installation position, no tilting of the rotor blade would be necessary. However, in order to turn the rotor blade to the desired 180° installation position, the clamp unit holding the lifted rotor blade has to be rotated by an angle of 90°. This is achieved by increasing the length of the rope section between the second rod unit 22 and the traverse 32. The corresponding operation of the winch 36 can be performed by a remote control unit. The more of the rope 34 the winch 36 releases, the more the clamp unit with the rotor blade will incline (see FIG. 4) in clockwise direction. By operating the winch 36 in the opposite manner, i. e. by decreasing the length of the rope section between the second rod unit 22 and the traverse 32, the rotor blade would rotate in counter-clockwise direction.

As can be seen in FIGS. 2 and 4, the axis of rotation A of the rotor blade is located vertically below the crane hook 38 and the traverse 32. It is advantageous to position the rotor blade in the clamp unit such that the axis of rotation A intersects or runs close by the center of gravity of the rotor blade.

It is to be understood that the first rod unit 20, especially the lateral clearance between the rods, is configured such that the rotor blade is prevented from colliding with the rods. Likewise, due to the outwardly protruding bearings, the first end portions of the rods of the second rod unit 22 do not impede the rotation of the rotor blade.

Since the root of the rotor blade can pass between the rods of the first rod unit 20, it is possible to rotate the rotor blade until the 180° position is reached and operation of the winch 36 can be stopped. This situation is shown in FIGS. 5a and 5b. In the 180° position the second ends 30 of the rods of the second rod unit 22 (or the respective coupling sites) as well as part of the rope 34 may loosely lie against the rotor blade.

Moreover, since the lateral clearance between the rods of the first rod unit 20 at their second ends 26 is greater than the diameter of the hub of the wind turbine, the traverse 32 can be moved directly above the hub by the crane (see FIGS. 5a and 5b). In that position, the root of the rotor blade directly faces the lower side of the hub, and the rotor blade may then be mounted to the hub before the clamps 14, 16 are unlocked and the tool 10 is removed from the rotor blade.

During the whole lifting and turning process, the crane hook 38 is always positioned above the traverse 32 and the axis of rotation (center of gravity) of the rotor blade.

While the lifting and rotation of a rotor blade into a 180° installation position has been described, it is of course possible to rotate the rotor blade, or any other long and heavy object 12, into other positions with the tool 10.

LIST OF REFERENCE SIGNS 10 tool
12 object
12a portion of object 12
12b leading edge
12c trailing edge
14 first clamp
16 second clamp
17 belt
18 strut(s)
20 first rod unit
22 second rod unit
24 first rod end (first rod unit)
26 second rod end (first rod unit)
28 first rod end (second rod unit)
30 second rod end (second rod unit)
32 traverse
34 rope
36 winch
38 hook
40 sling

The invention claimed is:

1. A tool for handling a wind turbine rotor blade, the tool comprising:
a winch;
a single rope;
a clamping unit which can be fixed to a rotor blade, the clamping unit having a first clamp and a second clamp spaced from the first clamp with respect to a longitudinal direction of the wind turbine rotor blade;
a first rod unit rotatably coupled to the first clamp of the clamping unit at a first coupling site and coupled to a traverse; and
a second rod unit rotatably coupled to the second clamp of the clamping unit at a second coupling site and coupled to the traverse via the single rope, a length of a rope section of the single rope between the second rod unit and the traverse being adjustable by the winch.

2. The tool according to claim 1, wherein the first and second clamps are interconnected by at least one strut.

3. The tool according to claim 2, wherein the strut has a predetermined length adapted to a distance between two given grabbing zones of a specific model of a wind turbine rotor blade.

4. The tool according to claim 1, wherein the first and second clamps include profiled shells adapted to a contour of the wind turbine rotor blade.

5. The tool according to claim 1, wherein a distance between the first coupling site and the traverse is smaller than a distance between the second coupling site and the traverse.

6. The tool according to claim 1, wherein the rods of the first and second rod units are coupled to the first and second clamps, respectively, by pivot bearings which protrude outwardly in opposite directions, respectively.

7. The tool according to claim 1, wherein the first rod unit includes a pair of rods, a lateral clearance between the pair of rods being greater than a largest diameter of a portion of the wind turbine rotor blade extending from the first coupling site in a direction away from the second coupling site.

8. The tool according to claim 7, wherein a length of the rods of the first rod unit is greater than a portion of the wind turbine rotor blade extending from the first coupling site in a direction away from the second coupling site.

9. The tool according to claim 7, wherein the lateral clearance between the rods of the first rod unit increases from the first coupling site towards the traverse.

10. The tool according to claim 1, wherein the second rod unit includes a pair of rods converging at a connection point where one end of the rope is attached.

11. The tool according to claim 1, wherein the winch is mounted on the traverse.

12. The tool according to claim 1, wherein the traverse is adapted to be coupled to a crane hook.

13. A method of manufacturing a wind power plant comprising the steps of:
using a tool for handling a wind turbine rotor blade, the tool comprising:
a winch;
a single rope;
a clamping unit which can be fixed to a rotor blade, the clamping unit having a first clamp and a second clamp spaced from the first clamp with respect to a longitudinal direction of the wind turbine rotor blade;
a first rod unit rotatably coupled to the first clamp of the clamping unit at a first coupling site and coupled to a traverse; and
a second rod unit rotatably coupled to the second clamp of the clamping unit at a second coupling site and coupled to the traverse via the single rope, a length of a rope section of the single rope between the second rod unit and the traverse being adjustable by the winch.

14. A tool for handling a wind turbine rotor blade, the tool comprising:
a winch;
a rope;
a clamping unit which can be fixed to a rotor blade, the clamping unit having a first clamp and a second clamp spaced from the first clamp with respect to a longitudinal direction of the wind turbine rotor blade;

a first rod unit rotatably coupled to the first clamp of the clamping unit at a first coupling site and coupled to a traverse, wherein the first rod unit includes at least one first rod having a first end directly coupled to the first clamp and a second end directly coupled to the traverse; and a second rod unit rotatably coupled to the second clamp of the clamping unit at a second coupling site and coupled to the traverse via the rope, wherein the second rod unit includes at least one second rod having a first end directly coupled to the second clamp and a second end coupled to the rope, and wherein a length of a rope section of the rope between the second rod and the traverse is adjustable by the winch.

15. The tool according to claim 14, wherein the rope comprises a single rope.

16. The tool according to claim 14, wherein the second end of the first rod is rotatably coupled to the traverse.

17. The tool according to claim 14, wherein the second end of the second rod is directly connected to one end of the rope and wherein an opposite end of the rope is directly connected to the traverse.

18. The tool according to claim 14, wherein the at least one first rod comprises a pair of first rods each having the first end directly coupled to the first clamp and the second end directly coupled to the traverse, and wherein the at least one second rod comprises a pair of second rods each having the first end directly coupled to the second clamp and the second end coupled to the rope.

* * * * *